United States Patent
Su et al.

(10) Patent No.: US 6,693,898 B1
(45) Date of Patent: Feb. 17, 2004

(54) CALL CONTROL MODEL FOR A PACKET-BASED INTELLIGENT TELECOMMUNICATIONS NETWORK

(75) Inventors: Shang-Fon Su, Naperville, IL (US); Margaret H. Yang, Naperville, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/495,187

(22) Filed: Feb. 1, 2000

(51) Int. Cl.[7] .............................................. H04L 12/50
(52) U.S. Cl. ...................................... 370/355; 370/466
(58) Field of Search ................................. 370/352, 353, 370/354, 467, 466, 401, 355

(56) References Cited

U.S. PATENT DOCUMENTS 6,148,069 A * 11/2000 Ekstrom et al. ............ 379/207
6,470,010 B1 * 10/2002 Sziatovszki et al. ........ 370/356
6,496,861 B1 * 12/2002 Sevcik ....................... 709/224

OTHER PUBLICATIONS

Stallins, "ISDN and Broadband ISDN with Frame Relay and ATM," 1999, Prentice HAll, 124.*

* cited by examiner

*Primary Examiner*—Kenneth Vanderpuye

(57) ABSTRACT

A packet-based inteligent telecommunications network that adheres to a call control model currently used for circuit-switched intelligent networks. Messages defined in the GR-1129 specification are exchanged between a service switching point and service node intelligent peripheral within the facility information element of H.225 commands on a H.323 network.

7 Claims, 1 Drawing Sheet

CALL CONTROL MODEL FOR A PACKET-BASED INTELLIGENT TELECOMMUNICATIONS NETWORK

BACKGROUND OF THE INVENTION

1. Field of the Invention

This invention relates in general to intelligent telecommunications networks. In particular, the invention relates to a packet-based service node and intelligent peripheral that allows for maintaining adherence to an existing circuit-switched intelligent network call control model.

2. Background Art

Intelligent Network ("IN") services have become an integral aspect of modern telecommunications. Toll free number service, caller ID, virtual private networks and number portability are just a few of the many Intelligent Network services that are demanded by telecommunications customers today and accordingly must be offered and implemented by telephone service providers.

Existing implementations of circuit-switched Intelligent Networks commonly adopt and conform to the Bellcore GR-1129 standard, which specifies a circuit-switched interface between two primary components of such an Intelligent Network: the Service Switching Point ("SSP") and the Service Node/intelligent Peripheral ("SN/IP"). A Service Switching Point is a switch that routes calls and is capable of querying external service applications or databases to process calls with intelligent features. The Service Switching Point queries a Service Control Point ("SCP") to invoke many Intelligent Network features.

The Service Control Point is an intelligent, highly reliable server that processes the service logic and subscriber databases for executing Intelligent Network services. Existing telecommunications systems typically include Service Control Points programmed to provide information, such as toll free telephone number references or call routing instructions, for use by other components of the Intelligent Network. A Service Control Point in a modern Intelligent Network typically resides on a Signaling System 7 ("SS7") signaling network, through which it can communicate with a Service Switching Point.

With the information and logic provided to the Service Switching Point by the Service Control Point, the Service Switching Point can utilize the ISDN PRI/BRI interface specified by the GR-1129 standard to interact with a SN/IP. In the GR-1129 call control model, a SN/IP is commonly used as a resource server that provides information to a network user and/or collects information from a network user via a circuit-switched bearer connection. The SN/IP typically uses subscriber-specific data stored on a Service Control Point to provide the call services. Therefore, in the call control model of a GR1129 enabled circuit-switched Intelligent Network, the Service.

Existing implementations of circuit-switched Intelligent Networks commonly adopt and conform to the Bellcore GR-1129 standard (Bellcore Gr-1129-CORE, "AINGR: Switch-Intelligent Peripheral Interface (IPI)", Issue 3, September 1977), which specifies a circuit-switched interface between two primary components of such an Intelligent Network: the Service Switching Point ("SSP") and the Service Node/intelligent Peripheral ("SN/IP"). A Service Switching Point is a switch that routes calls and is capable of querying external service applications or databases to process calls with intelligent features. The Service Switching Point queries a Service Control Point ("SCP") to invoke many Intelligent Network features. By routing voice communications over a common network, providers of multiple communications services can exploit and benefit from the efficiencies of packet communications, develop new services to take advantage of such convergence, and potentially avoid the added expense of developing and/or maintaining multiple networks.

One increasingly popular type of packet network utilizes the International Telecommunication Union H.323 standard, which provides a foundation for converged audio, video and data communications across packet-based networks that do not guarantee quality of service, such as TCP/IP. The H.323 standard is network, platform and application independent, and provides for applications and products that are interoperable among vendors. The actual protocols and message formats commonly implemented with H.323 networks are described by the H.225 standard, among others.

One proposed solution for implementing Intelligent Network functionality in a packet-based telecommunications network, such as a H.323 network, is the Bellcore SR-3511 standard. The Bellcore SR-3511 standard specifies a packet-based call control model featuring an application level Transaction Capabilities Application Part ("TCAP") interface over a TCP/IP transport directly connecting a packet-based Service Control Point and a packet-based SN/IP. Functionally, the SR-3511 interface allows the Service Control Point to interact with the SN/IP by directly providing information to guide SN/IP actions, and gathering information from the SN/IP. The SR-3511 standard therefore provides for the same level of functionality that is currently implemented by the circuit-switched GR-1129 model of Service Control Point messaging through the Service Switching Point to an ISDN SN/IP interface.

However, while implementing the SR-3511 standard would offer communication service providers and consumers alike the many functional advantages of a packet-based network, service providers have already developed vast and complex Intelligent Network infrastructures based upon the existing circuit-switched telephony protocols and call model. Implementation of new call control models such as the SR-3511 standard would require extensive redesign and redevelopment of many aspects of hardware and software, thereby preventing the reuse of certain existing hardware and software in newly developed packet-based INs. Such substantial changes entail great effort and expense for network products developers and network service providers alike.

Accordingly, it would be highly beneficial, and therefore it is an object of this invention, to provide a packet-based Intelligent Network that fully exploits the benefits of packet networks and applications convergence, while minimizing the required changes from the existing circuit-switched call model to allow some degree of hardware and/or software reuse when transitioning from a circuit-switched to packet-based network.

It is also an object of this invention to implement an Intelligent Network based upon standard packet network communication protocols, such as H.323.

These and other objects of the present invention will become apparent to those of ordinary skill in the art in light of the present specifications, drawings and claims.

SUMMARY OF THE INVENTION

The invention allows a packet-based intelligent telecommunications network to retain the call control model of the circuit-switched Bellcore GR-1129 standard, while implementing standard packet network protocols. Messaging is exchanged between the Service Control Point and SN/IP through the Service Switching Point, as in the GR-1129 model. Messaging between the network Service Switching Point and the Service Control Point may occur according to standards and protocols common to circuit-switched networks, such as SS7 or TCP/IP. The interface between the Service Switching Point and SN/IP is packet-based, such as H.323, rather than that specified by the GR-1129 standard. However, commands provided for by the GR-1129 standard are embedded within the packet-based messaging between the Service Switching Point and SN/IP. For example, when the packet Intelligent Network is based upon an H.323 network, a message provided for by the GR-1129 model is embedded within the facility information element of a H.225 command.

DETAILED DESCRIPTION OF THE DRAWINGS

Figure 1:
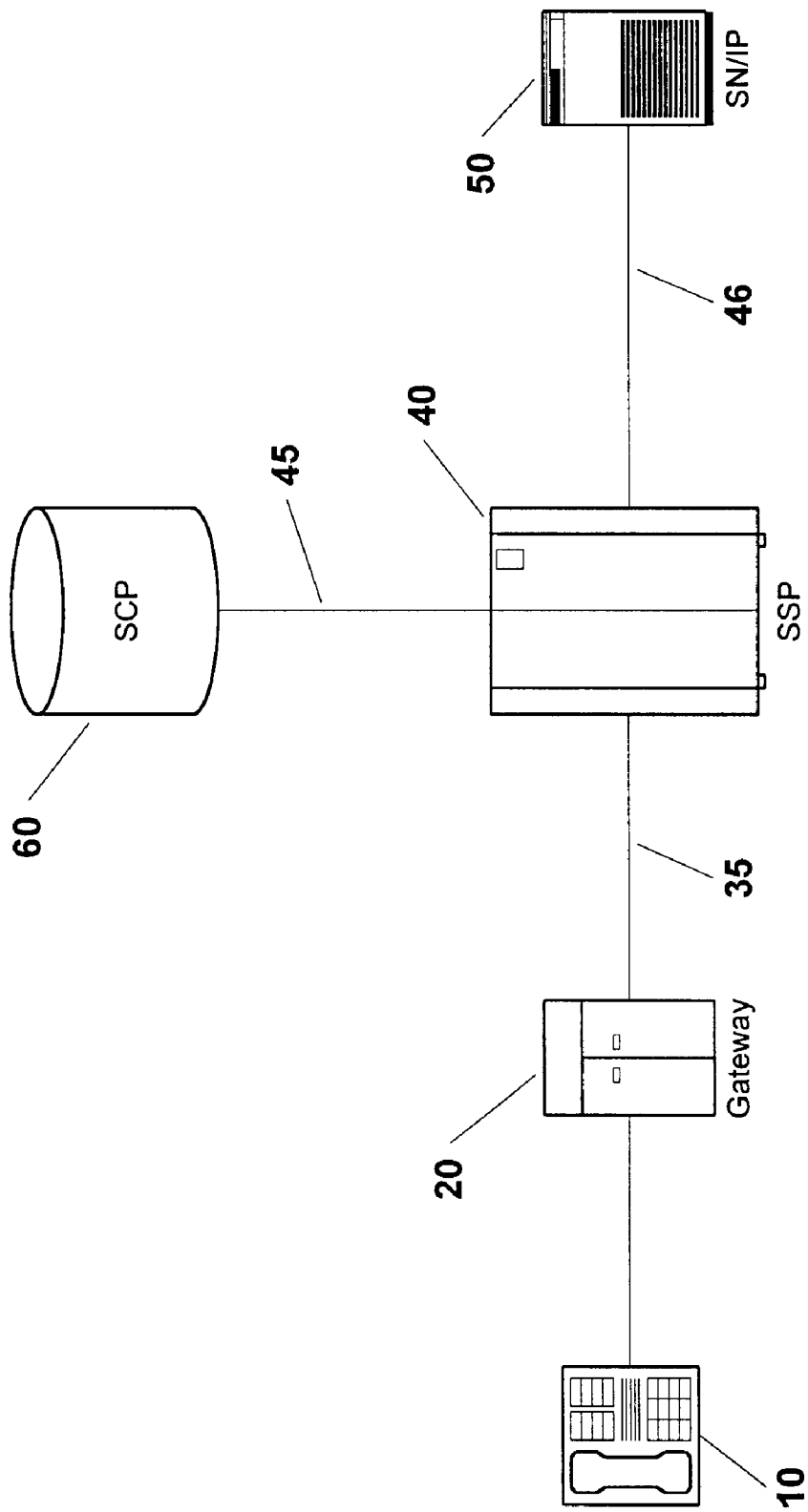
FIG. 1 is a block diagram of a packet-based intelligent telecommunications network that implements the GR-1129 call control model according to the present invention.

While this invention is susceptible to embodiment in many different forms, there are shown in the drawings and will be described in detail herein specific embodiments. The present disclosure is to be considered as an exemplification of the principle of the invention intended merely to explain and illustrate the invention, and is not intended to limit the invention in any way to embodiments illustrated.

The embodiment of FIG. 1 depicts a system by which a Service Control Point that is part of a conventional circuit-switched Intelligent Network can be utilized in conjunction with a packet-based Intelligent Network. The architecture disclosed eliminates the need for a specialized packet-based Service Control Point, thereby providing for faster and less costly implementation of packet-based Intelligent Networks and re-use of existing Service Control Point technology.

Specifically, as is the case with a circuit-switched Service Switching Point, in the context of a packet-based network, a packet-based Service Switching Point communicates with the Service Control Point via TCAP messaging on a first network. The protocol upon which the first network is based may depend upon the interface supported by the Service Control Point, such as the SS7 or TCP/IP TCAP interfaces used by current Service Control Points. The Service Switching Point, in turn, translates the TCAP signaling into messages defined by the GR1129 standard. The GR-1129 messages are then embedded within data packets on a second network, upon which the packet-based traffic is routed. In one sample embodiment, the second network is based upon the H.323 standard, and the GR-1129 messages are exchanged within the facility information element of H.225 commands transmitted thereon. In view of the network independent nature of H.323, the H.225 signaling channel may be implemented using one of several packet-based signaling protocols as provided by the specification, such as a TCP/IP virtual circuit or reliable UDP/IP. By utilizing the H.225 signaling channel to transmit GR-1129 type control messages, existing circuit-based Service Control Points can be utilized in conjunction with packet-based SN/IPs and the GR-1129 call control model can be maintained.

To illustrate the operation of the Intelligent Network embodiment of FIG. 1, a prompt and collect scenario will be explained, whereby a SN/IP is utilized to play an announcement to a telephone user, and collect digits dialed in response thereto. Packet telephone 10 initiates a call through gateway 20, transmitting a H.225 SETUP message to Service Switching Point 40 on packet-based line 35. Based upon the setup message received, Service Switching Point 40 determines that an audible announcement must be played to the caller, and dialed digits must be collected by the network, such as for prompting and collecting entry of a calling card number and/or personal identification number. Service Switching Point 40 returns a H.225 CALL PROCEEDING message to gateway 20.

Based upon the feature invoked—in this example a prompt and collect feature—an appropriate SN/IP must be selected for handling the feature. Accordingly, Service Switching Point 40 transmits a TCAP InfoAnalyzed message to Service Control Point 60 via SS7 network 45. Service Control Point 60 utilizes the message received to determine the translation and routing data needed to provide the invoked advanced network service. Service Control Point 60 then returns a TCAP SendToResource message to Service Switching Point 40, also via SS7 network 45. Service Switching Point 40 utilizes the message received from Service Control Point 60 to construct a GR-1129 standard SendToIPResource message. The SendToIPResource message is embedded in the facility information element of a H.225 SETUP message and sent to the selected SN/IP 50 via H.323 network 46, thereby avoiding the implementation of a direct SR-3511 interface between Service Control Point 60 and SN/IP 50.

With the routing information provided by Service Control Point 60, a talking path is established between SN/IP 50 and gateway 20, and an announcement is played to the user of telephone 10. Digits dialed by the user of telephone 10 are then received and recognized by SN/IP 50.

SN/IP 50 returns the result of the dialed digit collection to Service Control Point 60. This is accomplished by transmitting a GR-1129 standard Return Result message, which includes the dialed digits, within the facility information element of a H.225 FACILITY message from SN/IP 50 to Service Switching Point 40 via H.323 network 46. Packet-based Service Switching Point 40 then parses out the dialed digits and transmits them to Service Control Point 60 in a TCAP CallInfoFromResource command on SS7 network 45.

Depending on the feature being implemented, additional communication may occur between Service Control Point 60 and SN/IP 50 by way of TCAP messages on network 45, and GR-1129 commands transmitted within the facility information element of H.225 messages on H.323 network 46. For example, additional information may be collected from or conveyed to the user of telephone 10, or Service Control Point 60 can reroute the call to its final destination based upon information collected by SN/IP 50.

By virtue of the foregoing design and implementation, a Service Control Point from a pre-existing circuit-switched network may be reused in a newly configured packet-switched network.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

We claim:

1. A packet-based intelligent telecommunications network that implements the Bellcore GR-1129 circuit-switched call control model, the network comprising:

a first digital subnetwork implementing a packet-based communications protocol;

a service node intelligent peripheral that communicates via the first subnetwork;

a second digital communications subnetwork;

a service control point that communicates via the second subnetwork;

a service switching point that exchanges messages with the service control point via the second subnetwork, and exchanges messages with the service node intelligent peripheral via the first subnetwork, where the service switching point communicates over the first subnetwork with the service node intelligent peripheral by including GR-1129 commands as information elements contained within packets.

2. The apparatus of claim 1, in which the first subnetwork is based upon the H.323 protocol, and GR-1129 commands are transmitted within H.225 messages.

3. The apparatus of claim 2, in which the GR-1129 commands are transmitted within facility information elements of H.225 messages.

4. A method for exchanging information between a service control point and a service node intelligent peripheral, the method comprising the steps of:

receiving a message from the service control point by a service switching point;

transmitting a GR-1129 message from the service switching point to the service node intelligent peripheral via embedding the GR-1129 message as an information element contained within a packet transmitted over a packet-based digital communications link connecting the service switching point and the service node intelligent peripheral.

5. The method of claim 4, in which the GR-1129 message is transmitted within the facility information element of an H.225 message.

6. A method for transmitting information from a service switching point to a service node intelligent peripheral in response to a first GR-1129 message received from a service control point, the method comprising the steps of:

determining by the service switching point a second GR-1129 message to be communicated from the service switching point to the service node intelligent peripheral based on receipt of the first GR1129 message;

embedding the second GR-1129 message as an information element in a packet by the service switching point and;

transmitting the packet to the service node intelligent peripheral over a packet-based digital communications link connecting the service switching point and the service node intelligent peripheral.

7. The method of claim 6, in which the second GR-1129 message is transmitted within the facility information element of an H.225 message.

* * * * *